Feb. 3, 1942. A. L. LAMBERT Re. 22,018

DOOR

Original Filed March 16, 1934

INVENTOR
Albert L. Lambert
BY
Hoguet, Neary & Campbell
his ATTORNEYS

Reissued Feb. 3, 1942 Re. 22,018

UNITED STATES PATENT OFFICE 22,018

DOOR

Albert L. Lambert, Narberth, Pa., assignor to Heintz Manufacturing Company, Philadelphia, Pa., a corporation of Pennsylvania Original No. 1,990,909, dated February 12, 1935, Serial No. 715,822, March 16, 1934. Application for reissue February 4, 1937, Serial No. 124,144

11 Claims. (Cl. 114—201)

This invention relates to doors and more particularly relates to doors suitable for use as bulkhead doors or hatch covers on ships.

One of the principal objects of this invention is to provide a door which is water tight and one that is strong and able to resist great pressure without buckling or springing a leak and one that is verminproof, and at the same time is of simple and comparatively inexpensive construction and is light in weight.

Further objects of this invention will be in part obvious and in part pointed out hereinafter.

Figure 1:
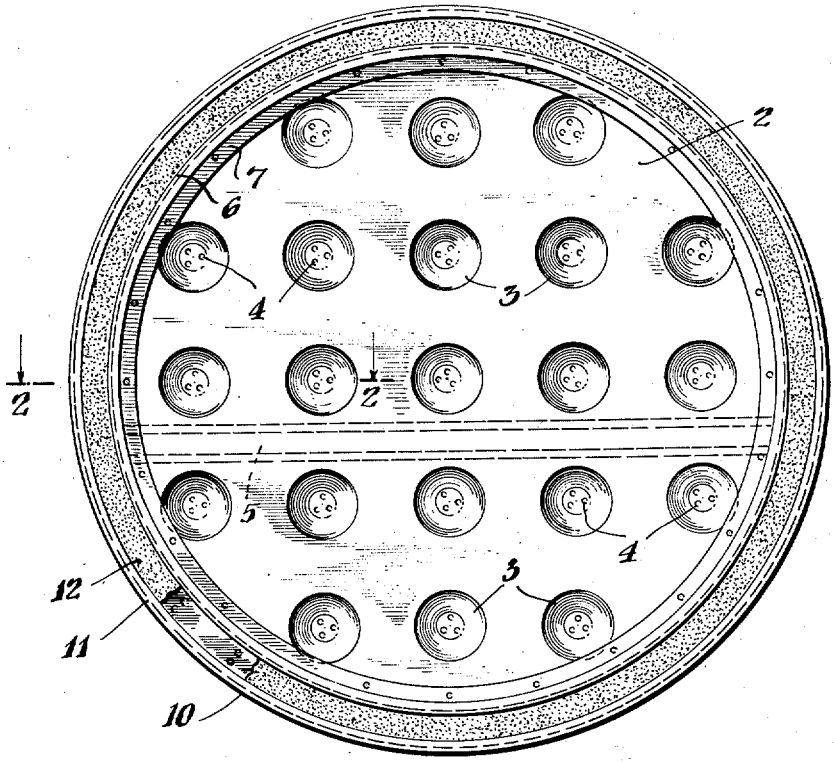
Figure 2:
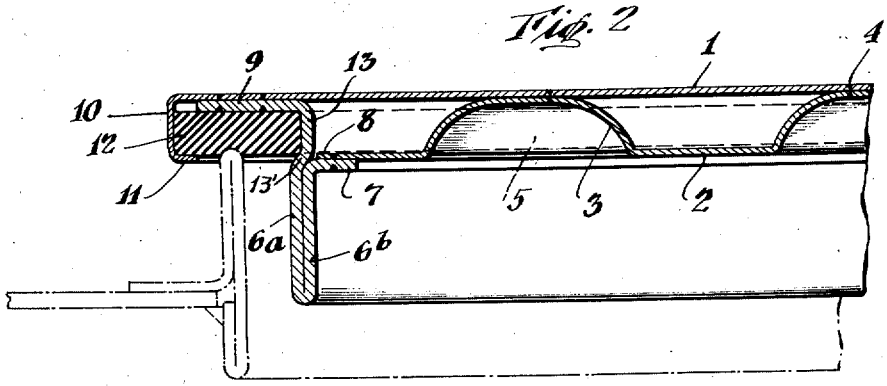

In order that a clear understanding of this invention may be had, attention is hereby directed to the accompanying drawing, forming a part of this application and illustrating certain possible embodiments of this invention, and in which:

Fig. 1 is a plan view looking toward the under or interior side of the door, and Fig. 2 is an enlarged sectional view of a portion thereof and is taken on line 2—2 of Fig. 1, a portion of cooperating jamb or coaming being indicated diagrammatically by dot and dash lines.

Similar reference characters refer to similar parts throughout both views of the drawing.

Referring to the drawing, the door or cover comprises an outside sheet metal plate or panel 1, and an inside panel metal plate or panel 2, spaced from sheet 1. If desired, panel 2 may be formed with integral depressions or bosses 3, which at their apices touch and are spot welded, as at 4, to panel 1, thus obtaining a truss construction of well known type. Further stiffening may be obtained by means of channel pieces 5, disposed between sheets 1 and 2 and spot welded or otherwise secured thereto.

An annular marginal reenforcing strip 6*a* is provided, and as shown, comprises a metal strip or plate member doubled flatwise upon itself to form a portion 6*b* extending at right angles from the inner or under side of the door or cover. The edge of the inner fold of portion 6*b* is bent inwardly toward the center of the door forming an attachment flange 7, and the edge 8 of the panel sheet 2 rests against and is welded to this flange. The other fold of the marginal strip 6*a* extends to the outer panel sheet 1 and has an outwardly extending attachment flange 9 seating against and spot welded to the panel sheet 1. Beyond flange 9 the edge of panel sheet 1 is bent rearwardly or downwardly, as at 10, and then toward the center of the door or cover, and forms a channel. The outside edge of a rubber gasket 12 seats in this channel and bears against the panel sheet portions 10 and 11. The gasket 12 also fits closely against the inner surface of flange 9 and at its inner edge seats closely against the marginal reenforcing member 6*a* which preferably is deformed, as at 13′, to provide a groove or recess 13 for this edge of gasket 12.

When the door or hatch cover is closed tightly against a suitable jamb or coaming, the gasket is compressed tightly against the flange 10 at one edge, against the flange 9 and against the marginal member 6*a* at its opposite edge, thus establishing an extremely water tight closure. This means of rendering the door or cover water tight eliminates the necessity of establishing a water tight union between the flange 9 and the outer panel sheet 1, and thus permits the joining of the panel 1 to the flange 9 by means of spot welding.

The door or hatch cover as shown and described is not only water tight but is exceedingly strong and resistant to pressure and cannot be penetrated by rats or other vermin.

It is also apparent that the door or cover may be made of sheet metal and is simple and inexpensive in construction and may be made light in weight. Other advantages will be readily apparent to those acquainted with the art.

Obviously the door may be made of other materials than sheet metal; and also, if desired, the trussing depressions 3 and stiffening channels 5 may be omitted, or other reenforcing and stiffening means may be provided between the inner and outer panel sheets. Accordingly, as many changes may be made in the above construction, and as many apparently widely different embodiments of the invention may be made without departure from the scope thereof, it is to be understood that all matter contained in the above description or shown in the accompanying drawing is to be interpreted as illustrative and not in a limiting sense.

What I claim is:

1. A door or cover construction of the character described, including, in combination, a panel having spaced inside and outside face plates, a marginal reenforcing member comprising an attachment flange portion lying against and secured to the inside face plate of said panel, an attachment flange portion lying against and secured to the outside face plate of said panel and an integral portion doubled flatly upon itself and disposed in angular relation to both said flange portions.

2. In a door or cover of the character described, in combination, a reenforcing edge member having a portion doubled flatly upon itself and disposed transversely of the plane of the door or cover and having attachment flanges extending from the doubled portion in opposite directions in spaced planes parallel with the plane of the door or cover, and spaced panel members secured to said attachment flanges.

3. In a door or cover of the character described, in combination, a reenforcing edge member having a portion doubled flatly upon itself and disposed transversely of the plane of the door or cover and having attachment flanges extending from the doubled portion in opposite directions in spaced planes parallel with the plane of the door or cover, spaced panel members secured to said attachment flanges, and reenforcing and spacing elements between said panel members.

4. In a door or cover of the character described, in combination, a reenforcing edge member having a portion doubled upon itself and disposed transversely of the plane of the door or cover and having attachment flanges extending from the doubled portion in opposite directions parallel with the plane of the door or cover, and spaced panel members secured to said attachment flanges, one of said panel members having a portion beyond said edge member shaped to provide a channel faced toward the center of the door or cover, and a gasket seated in said channel.

5. In a door or cover of the character described, in combination, a reenforcing edge member having a portion doubled upon itself and disposed transversely of the plane of the door or cover and having attachment flanges extending from the doubled portion in opposite directions parallel with the plane of the door or cover, and spaced panel members secured to said attachment flanges, one of said panel members having a portion beyond said edge member shaped to provide a channel faced toward the center of the door or cover, and a gasket having one edge seated in said channel and having one side and the other edge seated against said reenforcing member.

6. A door or hatch cover, or the like, of the character described, including, in combination, paneling having an outside sheet member and an inside sheet member, and a reenforcing edge member having an attachment flange extending away from the center of the door and seating against and secured to the outside sheet member and having an attachment flange extending toward the center of the door and seating against and secured to the inside sheet member, the material of the edge member intermediate said attachment flanges being doubled upon itself and extending inwardly or rearwardly of the inside sheet member.

7. A door or hatch cover, or the like, of the character described, including, in combination, paneling having an outside sheet member and an inside sheet member, and a reenforcing edge member having an attachment flange extending away from the center of the door and seating against and secured to the outside sheet member and having an attachment flange extending toward the center of the door and seating against and secured to the inside sheet member, the material of the edge member intermediate said attachment flanges being doubled upon itself and extending inwardly or rearwardly of the inside sheet member, the said outside sheet member having a channel portion beyond the edge member with the channel facing toward the center of the door, and a gasket seating in said channel and against the reenforcing edge member.

8. A door or hatch structure of the character described, including, in combination, spaced outside and inside panels and a marginal stiffening member, said member comprising a flange directed away from the center of the door or hatch and secured to the outside panel, a second flange extending at an angle to the first mentioned flange across and beyond the periphery of the inside panel, and a third flange carried by the second flange and extending in spaced relation to the outside panel and extending substantially at a right angle from said second flange toward the center of the door or hatch, said third flange being secured to said inside panel.

9. A door or hatch structure of the character described, including, in combination, spaced outside and inside panels and a marginal stiffening member, said member comprising a flange directed away from the center of the door or hatch and secured to the outside panel, a second flange extending at an angle to the first mentioned flange across and beyond the periphery of the inside panel, and a third flange carried by the second flange and extending in spaced relation to the outside panel and substantially at a right angle from said second flange toward the center of the door or hatch, said third flange being secured to said inside panel; and said outside panel having a portion thereof extending beyond the peripheral edge of and at an angle to the plane of the first mentioned flange and turned inwardly to provide a gasket-retaining recess opening toward the center of the door or cover.

10. A door or hatch structure of the character described, including, in combination, spaced outside and inside panels and a marginal stiffening member, said member comprising a flange directed away from the center of the door or hatch and spot welded to the outside panel, a second flange extending at an angle to the first mentioned flange across and beyond the periphery of the inside panel, said second flange being outwardly offset intermediate its ends to provide a gasket-retaining recess, and a third flange carried by the second flange and extending in spaced relation to the outside panel and at an angle from said second flange toward the center of the door or hatch, said third flange being secured to said inside panel; and said outside panel having a portion thereof extending beyond the peripheral edge of and at an angle to the plane of the first mentioned flange and turned inwardly to provide a gasket-retaining recess opening toward the center of the door or hatch.

11. A door or hatch structure of the character described, including, in combination, spaced outside and inside panels and a marginal stiffening member, said member comprising a flange directed away from the center of the door or hatch and secured to the outside panel, a second flange extending at an angle to the first mentioned flange across and beyond the periphery of the inside panel, and a third flange carried by the second flange and extending in spaced relation to the outside panel and at an angle from said second flange toward the center of the door or hatch, said third flange being secured to said inside panel, said outside panel having a portion thereof extending beyond the peripheral edge of and at an angle to the plane of the first mentioned flange and turned inwardly to provide a gasket-retaining recess opening toward the center of the door or cover, and means on said second flange defining a gasket-retaining recess cooperating with said first mentioned recess to retain the side edges of a gasket disposed in contact with the inside surface of the first mentioned flange with its edges held in said recesses.

ALBERT L. LAMBERT.